United States Patent

[11] 3,533,470

| [72] | Inventors | Byron E. Marsh<br>Western Springs, Illinois;<br>Benjamin Mosier, Houston, Texas |
|---|---|---|
| [21] | Appl. No. | 801,756 |
| [22] | Filed | Feb. 24, 1969 |
| [45] | Patented | Oct. 13, 1970 |
| [73] | Assignee | Armour Industrial Chemical Company<br>Chicago, Illinois<br>a corporation of Delaware<br>A substitute for application Ser. No. 650,227,<br>June 30, 1967, now abandoned. This<br>application Feb. 24, 1969, Ser. No. 801,756 |

[54] OIL WELL TREATMENT
14 Claims, No Drawings

[52] U.S. Cl. .................................................. 166/295,
166/300, 166/304, 166/312, 252/8.3
[51] Int. Cl. .................................................. E21b 33/13,
33/13, E21b 43/27, E21b 21/00
[50] Field of Search .................................................. 166/295,
300, 304, 312; 252/83

[56] References Cited
UNITED STATES PATENTS

| 3,237,691 | 3/1966 | Koch et al. | 166/38 |
| 3,250,330 | 5/1966 | Smith | 166/38 |
| 3,330,347 | 7/1967 | Brown et al. | 166/38 |
| 3,344,858 | 10/1967 | Gilchrist et al. | 166/38 |

*Primary Examiner* — James A. Leppink
*Attorneys* — Alexander and Speckman and Carl C. Batz

ABSTRACT: Method of treating wells to increase hydrocarbon production by injection into the well bore and surrounding formation of chemicals such as an amine and an isocyanate which react in situ to result in increased oil production from the treated well by actions such as rendering the formation relatively more permeable to oil than water, consolidation of sand, prevention of clay swelling, or paraffin deposition control.

OIL WELL TREATMENT

CROSS-REFERENCE TO RELATED APPLICATION

This application is a substitute for our U.S. Pat. No. application Ser. No. 650,227, filed June 30, 1967, now abandoned.

Decreased production of petroleum from wells is frequently caused by intrusion of water into the producing formation resulting in the necessity of pumping relatively high volumes of water to the surface and eventually the more serious condition known as water coning, the collapse and movement of sand formations resulting in decreased oil flow, the swelling of clay containing formations to prevent fluid flow, and the deposition, formation or accumulation of paraffin and similar substances in oil producing formations and on well tubings thus clogging liquid flow.

It is an object of this invention to provide an improved method of treating a fluid-bearing subterranean formation to increase oil production. It is a further object of this invention to provide a well treatment to obtain a higher permeability ratio of oil to water in the producing formation, consolidation of sand, prevention of clay swelling, and control of paraffin deposition. Still another object of the instant invention is to provide an oil well treatment method which results in long lasting increased hydrocarbon production.

These objects as well as others which will become apparent as the specification proceeds, are achieved by introduction into the well tubing and surrounding formation of chemicals which react in situ to render the formation relatively more permeable to oil than water, consolidate sand formations, modify the surface of clay to prevent swelling when contacted with water, and control paraffin deposition. One embodiment of this invention involves the injection of an amine and an isocyanate to react in situ in the well formation or well tubing to form urea or polyurea.

Suitable ureas and polyureas may be formed in situ by the reaction of aliphatic amino compounds with aromatic and aliphatic isocyanates and polyisocyanates respectively. Generally the utilization of a diamine results in superior oil-wetting characteristics, while use of a monoamine results in oil-containing fluids having especially good thixotropic and paraffin control properties. Mixtures of amines and mono- and polyisocyanates may be used to achieve combinations of desired results for specific well conditions. Depending upon proportions of amine and isocyanate, either an isocyanate or an amine terminated structure will result. The isocyanate terminated polyurea may moisture cure in the formation or tubing.

Aliphatic amino compounds are preferred amine reactants, particularly amines containing an aliphatic group of from about 6 to 22 carbon atoms attached to an amino nitrogen. Such aliphatic groups may be branched or straight chain and saturated or unsaturated. N-*secondary*-alkyl amines are especially useful due to their low melting points. When aliphatic diamines are used, the amino functions are preferably connected by an alkylene radical having from 2 to 4 carbon atoms and the diamine contains an aliphatic group of from about 6 to 22 carbon atoms attached to an amino function. Preferred diamines include N-alkyl trimethylene diamines wherein the aliphatic group may be primary, secondary, and tertiary alkyl. The aliphatic group may be a cyclic group or an arylalkyl group such as is present in the amine derived from phenyl-stearic acid, or it may be an amino substituted group resulting in tetra-amines such as N,N'-(γ-aminopropyl)-aminostearylamine and N,N'-(γ-aminopropyl)-aminomethylstearyl-amine. Amines may also be formed in situ from Schiff's bases.

Isocyanates suitable for the process of this invention include those isocyanates which react with an amine to form a urea or polyurea. Long chain aliphatic isocyanates are suitable wherein the aliphatic group contains from about 6 to 22 carbon atoms. It is preferred to use difunctional isocyanates, or pre-polymers thereof, including diisocyanates such as toluene diisocyanate, hexamethylene diisocyanate, and long chain aliphatic diisocyanates such as derived from aminostearylamine and aminomethylstearylamine.

The amount of chemical suitable for use in the treatment method of this invention varies over wide ranges. When the treatment method is effected primarily to alter the surface characteristics of the formation, the amount of chemical necessary is dependent upon the volume of the formation to be treated and the particle size encountered in the formation. Introduction of amines to the well bore in a concentration of more than about 25 p.p.m. in a liquid hydrocarbon such as kerosene is especially satisfactory for the treatment method of this invention. The upper limit of the amount of chemical introduced according to this invention is not critical, but from practical considerations, an amine concentration from about 25 to 10,000 p.p.m. is suitable. Concentrations from about 200 to 1,000 p.p.m. produce especially good treatment results. The amount of the polyisocyanate required varies from an amount less than the equivalent stoichiometric requirement for reaction with the amine to an excess of an equivalent amount on the basis of the amine, dependent upon the primary function of the treatment and desirability of an amine or isocyanate terminated polymer. When an amine terminated polyurea is desired, about 1.5 to 3.0 equivalent moles of diamine per mole of diisocyanate is preferred. The number of repeating units of the amine terminated polyurea may vary from 1 to about 50. When excess isocyanate is used to result in an isocyanate terminated polyurea, the number of repeating units may vary from 1 to about 1,000 and the moisture cured repeating unit may vary from 0 to about 50.

The chemicals may be introduced into the well using gas or in solution in a liquid hydrocarbon such as kerosene or according to any of the methods for introduction of chemicals into a well as practiced by those skilled in the art.

One phase of our invention relates to a method for overcoming water-coning which results from the entry of bottom waters into hydrocarbon producing wells. The water, having a greater density than the petroleum, normally remains at the bottom of the formation, however, at high rates of production, the water saturation in the formation rises as a result of a pressure gradient resulting from increased flow of liquid petroleum into the well bore. Thus, the water rises into the petroleum producing formation surrounding the entrance to the well bore becoming substantially water saturated.

The desirability of injection of reverse-wetting chemicals into oil wells to increase oil production has been recognized for many years. Aliphatic amino compounds have been used with limited success to stimulate the production of oil. Such treatments have been successful in increasing the production of oil over relatively short periods of time, or over extended periods of time if a reinjection schedule is administered.

One embodiment of this invention relates to a method of rendering the subterranean formation surrounding a well bore preferentially oil wettable comprising treating said formation with an amine containing an aliphatic group of from about 6 to 22 carbon atoms attached to an amino function and an organic isocyanate, said amine and said isocyanate reacting in situ to form a compound selected from the group consisting of urea and polyurea. The formation surrounding the well bore may be siliceous or carbonate, for example, dolomite, or calcite, or mixtures thereof. The amine will generally form a film on the negatively charged surfaces of mineral particles of siliceous materials such as sand. The amine may be chemisorbed upon surfaces such as limestone or dolomite. Then a mono- or polyfunctional isocyanate may be introduced into the well formation wherein it reacts in situ with the amine to form a urea or polyurea resulting in a formation exhibiting a high degree of oil permeability as compared to water permeability. The treatment method of this invention results in a formation which retains its enhanced oil permeability for long period of time.

Another phase of this invention relates to sand consolidation in oil well formations. The problem of "sanding" in oil wells, and particularly in offshore oil wells, may be a major factor in decreased petroleum production from a well. Subterranean sand formation surrounding a well bore is effectively consolidated by the method comprising treating said formation with an amine containing an aliphatic group of from about 6 to 22 carbon atoms attached to an amino function and an organic isocyanate, said amine and said isocyanate reacting in situ to form a compound selected from the group consisting of urea and polyurea. The treatment method of this invention results in long lasting sand consolidation in the well formation and at the same time renders the sand formation more permeable to oil relative to water.

Another phase of this invention relates to the treatment of subterranean formations containing argillaceous materials such as clay, slate and the like. Argillaceous materials swell resulting in general movement and plugging of an underground formation when such materials are contacted by an aqueous medium such as water seepage into the well formation, injections of aqueous based medium into the formation for various treatments, and, particularly, in secondary oil recovery operations. Swelling of subterranean argillaceous material surrounding a well bore is reduced by the method of this invention comprising treating said materials with an amine containing an aliphatic group of from about 6 to 22 carbon atoms attached to an amino function and an organic isocyanate, said amine and said isocyanate reacting in situ to form a compound selected from the group consisting of urea and polyurea. Treatment according to the method of this invention renders the surface of the argillaceous material hydrophobic and resistant to swelling as well as increasing the oil permeability of the formation relative to the water permeability by rendering the surfaces oil wet, substantially increasing oil production from wells susceptible to argillaceous swelling problems. Control of clay swelling in secondary oil recovery operations is achieved by injection of the amine and isocyanate into the secondary well to react in situ on the argillaceous materials.

Another phase of this invention relates to control of paraffin deposition in well tubings and subterranean formations. Deposition of paraffin-like solid hydrocarbon materials contained in petroliferous fluids is a natural occurrence which is enhanced by colder temperatures and which materially decreases oil production in wells in which such deposits occur. A method of controlling deposition of paraffin contained in petroliferous liquids in subterranean formations surrounding a well bore and in oil well tubing comprising adding to said fluids an amine containing an aliphatic group of from about 6 to 22 carbon atoms attached to an amino function and an organic isocyanate, said amine and said isocyanate reacting in situ to form a compound selected from the group consisting of urea and polyurea.

The following examples are presented to illustrate the present invention.

EXAMPLE I

Tests were conducted to compare the durability of films of various amines alone and ureas formed from the in situ amine-isocyanate reaction on the surface of sand.

A. Kerosene (118 ml.) containing the noted concentration of amine was added to an 8-ounce French square bottle. Ten drops of a 1 percent solution of Dupont oil red dye was added to the kerosene. Water (118 ml.) was added to the test bottle. Ten grams of Ottawa sand (20—40 mesh) was sprinkled into the top of the test bottle, permitting the sand to pass through the kerosene and water phases and to settle in the bottom of the bottle. The sand was noted in all cases to be oil wet by the color imparted by the dye in the kerosene phase. Two hours after introduction of the sand, the oil and water phases were decanted and the sand washed with 100 ml. portions of water until the color was removed from the sand. The number of washings required to remove the color from the sand, indicating the durability of the amine film, is shown in table 1.

TABLE I

| Concentration | Number of Washings | | | |
|---|---|---|---|---|
| | 1% | 0.5% | 0.25% | 0.1% |
| Amine: | | | | |
| N-sec-alkyl($C_{7-9}$)amine [1] | 0 | 0 | 0 | 0 |
| N-sec-alkyl($C_{11-14}$)amine | 1 | 0 | 0 | 0 |
| N-sec-alkyl($C_{7-9}$)trimethylene diamine | 6 | 3 | 0 | 0 |
| N-sec-alkyl($C_{11-14}$)trimethylene diamine | 6 | 9 | 5 | 4 |
| N-sec-alkyl($C_{15-19}$)trimethylene diamine | 10 | 10 | 9 | 8 |

[1] The N-sec-alkyl amines used in these examples were isomeric mixtures of amines derived from olefins. The ($C_{7-9}$) designation refers to the chain lengths in the cut of the olefin used.

The N-sec-alkyl amines used in these examples were isomeric mixtures of amines derived from olefins. The ($C_{7-9}$) designation refers to the chain lengths in the cut of the olefin used.

B. Kerosene (118 ml.) containing the noted concentration of amine was added to the test bottle with the oil soluble dye. Ten grams of Ottawa sand (20—40 mesh) was added to the test bottle and allowed to remain in the kerosene-amine-dye solution. The liquid was decanted and kerosene containing octadecyl isocyanate, in an amount equal in weight to amine used, and dye were added to the test bottle. The oil phase was decanted and the sand washed as above. The number of washings are shown in table II.

TABLE II

| Concentration | Number of Washings | | | |
|---|---|---|---|---|
| | 1% | 0.5% | 0.25% | 0.1% |
| Amine-octadecyl isocyanate: | | | | |
| N-sec-alkyl($C_{7-9}$)amine | 3 | 2 | 1 | 1 |
| N-sec-alkyl($C_{11-14}$)amine | 2 | 2 | 1 | 1 |
| N-sec-alkyl($C_{7-9}$)N-trimethylene diamine | 11 | 9 | 2 | 2 |
| N-sec-alkyl($C_{11-14}$)N-trimethylene diamine | 11 | 10 | 9 | 5 |
| N-sec-alkyl($C_{15-19}$)N-trimethylene diamine | 12 | 12 | 11 | 9 |

The above tables clearly show the increased durability of the amine-isocyanate in situ reaction product over use of the amine alone.

EXAMPLE II

A Berea sandstone core (1-½"×2-½") was introduced into a core holder and saturated with 3N NaCl and flooded to connate water with kerosene. Four pore volumes of kerosene containing 1 percent by weight N-sec-alkyl($C_{15-19}$) trimethylene diamine were passed through the core. Then two pore volumes of kerosene containing 1 percent by weight toluene diisocyanate were introduced into the core. This solution was then displaced by kerosene and aqueous 3N NaCl to furnish oil well brine conditions. The core was set aside for 48 hours and the permeability to brine and several pore volumes of kerosene was measured after which the permeability to salt water was again measured. The core permeabilities during the above-described procedure are shown in table III.

TABLE III

| Fluid | Core Perfeability (Millidarcies) |
|---|---|
| 3N NaCl | 3.95 |
| Kerosene | 3.80 |
| Kerosene plus 1% amine | 2.45 |
| Kerosene plus 1% diisocyanate | 0.89 |
| Kerosene | 1.34 |
| 3N NaCl | 0.30 |
| After 48 Hours: | |
| 3N NaCl | 0.23 |
| Kerosene | 1.20 |
| Do | 1.30 |
| Do | 1.22 |
| Do | 1.30 |
| Do | 1.33 |
| 3N NaCl | 0.15 |

The data of table III show the change of the core surface to a hydrophobic surface with the increased oil permeability relative to water permeability. Further, the results clearly show the durability of the amine-diisocyanate in situ reaction product on the core surface.

EXAMPLE III

The cores were first saturated with aqueous 3N NaCl followed by displacement with kerosene (Connate water) and then followed by aqueous 3N NaCl to displace the kerosene. This resulted in cores flooded to residual oil saturation of 80 percent. Then kerosene containing 250 p.p.m. of the noted amine was introduced to the core followed by kerosene containing 250 p.p.m. of the noted diisocyanate. The core was then flooded with kerosene followed by 3N NaCl. The permeabilities were measured and cores visually examined at each stage. Table IV shows the permeabilities measured.

The above data clearly show the effective suspension of paraffin in kerosene by the addition of kerosene gel obtained by the in situ reaction of toluene diisocyanate with the noted amine.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method of increasing petroleum production comprising introducing to a well bore and subterranean formation surrounding said well bore an amine-containing an aliphatic group of from about 6 to 22 carbon atoms attached to an

TABLE IV

| | | Permeability (millidarcies) | | | | |
|---|---|---|---|---|---|---|
| | | Untreated | | | After Treatment | |
| Core | Reactants | Brine | Kerosene | Brine | Kerosene | Brine |
| Berea Sandstone | N-sec-alkyl($C_{15-19}$) trimethylene diamine; toluene diisocyanate | 4.1 | 2.1 | 0.8 | 1.8 | 0.16 |
| Do | N-sec-alkyl($C_{11-14}$) trimethylene diamine; toluene diisocyanate | 3.8 | 2.3 | 0.72 | 2.1 | 0.19 |
| Do | N-sec-alkyl($C_{15-19}$)amine; toluene diisocyanate | 7.4 | 2.4 | 1.6 | 2.4 | 0.32 |
| Do | N-oleyl trimethylene diamine; toluene diisocyanate | 7.5 | 2.5 | 1.4 | 2.7 | 0.31 |
| Do | N,N'-($\gamma$-aminopropyl)-aminomethyl-stearylamine; toluene diisocyanate | 7.6 | 2.9 | 1.4 | 2.8 | 0.69 |
| Do | N-sec-alkyl($C_{15-19}$) trimethylene diamine; diisocyanate of aminomethylstearylamine | 4.2 | 2.0 | 0.67 | 2.0 | 0.18 |
| Calcite | N-sec-alkyl($C_{15-19}$) trimethylene diamine; toluene diisocyanate | 2.6 | 0.9 | 0.65 | 1.1 | 0.09 |
| Unconsolidated Sand No. 16 | N-sec-alkyl($C_{15-19}$) trimethylene diamine; toluene diisocyanate | 15.7 | 5.9 | 2.7 | 5.9 | 0.42 |

The above results clearly show the increase in permeability of cores to hydrocarbons relative to brine following treatment with the amine and diisocyanate to form polyurea in situ.

Examination of the sand shows the treatment to be effective in consolidating the sand.

EXAMPLE IV

Kerosene gels were formed by the in situ reaction of the noted amine with toluene diisocyanate using 2 moles of amine per mole of toluene diisocyanate. The noted amounts of kerosene gel were added to 100 mls. of kerosene in 150 ml. beakers. The beakers were warmed and the noted 2 or 10 percent paraffin wax was added to each beaker and the heating continued until the paraffin dissolved in the kerosene. The beakers were maintained at 150°F. for 15 minutes and then at 110°F. for 15 minutes. The beakers were then maintained at room temperature and observed for paraffin wax crystallization on the sides of the beakers. The beakers were reheated as above to solubilize the paraffin and then maintained at 0°F. and again observed for paraffin wax deposition. The results are shown in table V.

TABLE V

| | | | Percent Paraffin Wax Suspended | |
|---|---|---|---|---|
| Chemical (Amine) | Conc. (p.p.m.) | Paraffin Wax (percent) | Room Temp. | 0°F. |
| None (Control) | — | 2 | 0 | 0 |
| N-sec-alkyl($C_{7-9}$)amine | 50 | 2 | 100 | 0 |
| | 100 | 2 | 100 | 50 |
| | 1,000 | 2 | 100 | 50 |
| | 3,000 | 2 | 100 | 100 |
| N-sec-alkyl($C_{9-10}$)amine | 50 | 2 | 100 | 50 |
| | 100 | 2 | 100 | 50 |
| | 1,000 | 2 | 100 | 50 |
| | 5,000 | 2 | 100 | 100 |
| N-sec-alkyl($C_{11-14}$)amine | 50 | 2 | 100 | 50 |
| | 100 | 2 | 100 | 50 |
| | 1,000 | 2 | 100 | 0 |
| N-sec-alkyl($C_{15-20}$)amine | 50 | 2 | 50 | 0 |
| | 1,000 | 2 | 50 | 0 |
| | 5,000 | 10 | 100 | 100 |
| N-cocoamine | 50 | 2 | 50 | 0 |
| | 1,000 | 2 | 50 | 0 |
| N-oleylamine | 50 | 2 | 50 | 0 |
| | 1,000 | 2 | 50 | 0 | amino function and an organic isocyanate, said amine and said isocyanate reacting in situ to form a compound selected from the group consisting of urea and polyurea.

2. A method of rendering the subterranean siliceous formation surrounding a well bore preferentially oil-wettable comprising treating said formation with an amine containing an aliphatic group of from about 6 to 22 carbon atoms attached to an amino function and an organic isocyanate, said amine and said isocyanate reacting in situ to form a compound selected from the group consisting of urea and polyurea.

3. The method of claim 2 wherein said amine is a diamine.

4. The method of claim 3 wherein said diamine is N-alkyl-trimethylenediamine.

5. The method of claim 4 wherein said diamine is N-sec-alkyl-trimethylenediamine.

6. The method of claim 5 wherein said diamine is N-sec-alkyl ($C_{15}$)-trimethylene diamine.

7. The method of claim 2 wherein said isocyanate is a diisocyanate.

8. The method of claim 7 wherein said diisocyanate is an aliphatic diisocyanate.

9. The method of claim 7 wherein said diisocyanate is toluene diisocyanate.

10. The method of claim 2 wherein said amine is N-sec-alkyl-trimethylenediamine and said isocyanate is toluene diisocyanate.

11. The method of claim 2 wherein said amine is introduced into said bore in an oil solution containing at least 25 p.p.m. of said amine.

12. A method of reducing swelling of subterranean argillaceous material surrounding a well bore when contacted with water comprising treating said material with an amine containing an aliphatic group of from 6 to 22 carbon atoms attached to an amino function and an organic isocyanate, said amine and said isocyanate reacting in situ to form a compound selected from the group consisting of urea and polyurea.

13. A method for the consolidation of subterranean sand formation surrounding a well bore comprising treating said formation with an amine containing an aliphatic group of from about 6 to 22 carbon atoms attached to an amino function and an organic isocyanate, said amine and said isocyanate reacting in situ to form a compound selected from the group consisting of urea and polyurea.

14. A method of controlling deposition of paraffin contained in petroliferous fluids in subterranean formations surrounding a well bore and in oil well tubing, comprising adding to said fluids an amine containing an aliphatic group of from about 6 to 22 carbon atoms attached to an amino function and an organic isocyanate, said amine and said isocyanate reacting in situ to form a compound selected from the group consisting of urea and polyurea.